United States Patent [19]

Prodel et al.

[11] Patent Number: 4,513,854

[45] Date of Patent: Apr. 30, 1985

[54] MACHINES FOR ASSEMBLING OR FOR MACHINING PARTS

[76] Inventors: Maurice Prodel, 153, rue de Verdun Carlepont; Jacques Prodel, Rue de Cuts Carlepont, both of 60170 Ribecourt, France

[21] Appl. No.: 471,852

[22] Filed: Mar. 3, 1983

[30] Foreign Application Priority Data

Mar. 5, 1982 [FR] France ................. 82 03757

[51] Int. Cl.³ .............................................. B65G 37/00
[52] U.S. Cl. ..................... 198/472; 198/605; 104/165
[58] Field of Search .............. 198/349, 370, 371, 457, 198/472, 580, 604, 605, 626, 648, 725, 790; 414/235, 236, 237, 238, 239, 240; 104/185, 186, 104/187, 165, 198, 199

[56] References Cited

U.S. PATENT DOCUMENTS

| | | | |
|---|---|---|---|
| 2,652,919 | 9/1953 | Jochem | 198/605 X |
| 2,837,223 | 6/1958 | Wolff | 414/237 |
| 3,221,754 | 12/1965 | Robson et al. | 198/472 X |
| 3,272,240 | 9/1966 | Roth | 198/472 X |
| 3,313,393 | 4/1967 | Solski et al. | 198/472 |
| 3,315,778 | 4/1967 | Kendall et al. | 198/580 X |
| 3,530,571 | 9/1970 | Perry | 198/349 X |
| 3,934,700 | 1/1976 | Schubert et al. | 198/472 X |
| 4,014,428 | 3/1977 | Ossbahr | 198/586 X |
| 4,019,623 | 4/1977 | Tassi et al. | 198/457 |
| 4,040,533 | 8/1977 | DeBoer et al. | 198/472 X |

FOREIGN PATENT DOCUMENTS

| | | | |
|---|---|---|---|
| 2518689 | 11/1976 | Fed. Rep. of Germany | 198/472 |
| 2644136 | 4/1978 | Fed. Rep. of Germany | 198/472 |
| 2710180 | 9/1978 | Fed. Rep. of Germany | 198/457 |
| 416968 | 9/1934 | United Kingdom | 414/238 |
| 2040244 | 8/1980 | United Kingdom | . |

Primary Examiner—Robert J. Spar
Assistant Examiner—Jonathan D. Holmes
Attorney, Agent, or Firm—Sandler & Greenblum

[57] ABSTRACT

An installation for assembling and/or machining parts manually and/or automatically, the installation comprising a plurality of stations or modules through which part-carrying platens move along a path comprising successive horizontal path portions extending at right angles to one another. The platens are driven along successive path portions by successive belts which at least partially support the platens, the improvement being that each module has as many belts (93, 99, 118) as it has perpendicular path portions, with each belt comprising an endless loop having a driving portion (95) and a return portion (94). The portions extend between a pair of vertical axis pulleys (88, 94') located in the vicinity of the ends of each path portion, with successive perpendicular endless loops being at different horizontal levels, whereby successive loops within a module share a common pulley having two loop-receiving grooves (94, 102) at the different levels, thereby enabling a single motor to drive all the endless loops within any one module.

30 Claims, 15 Drawing Figures

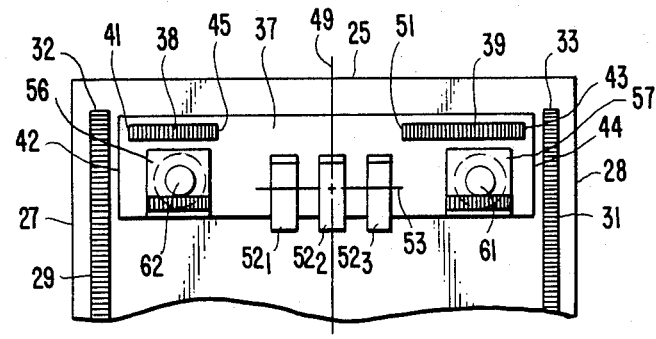
FIG. 3.
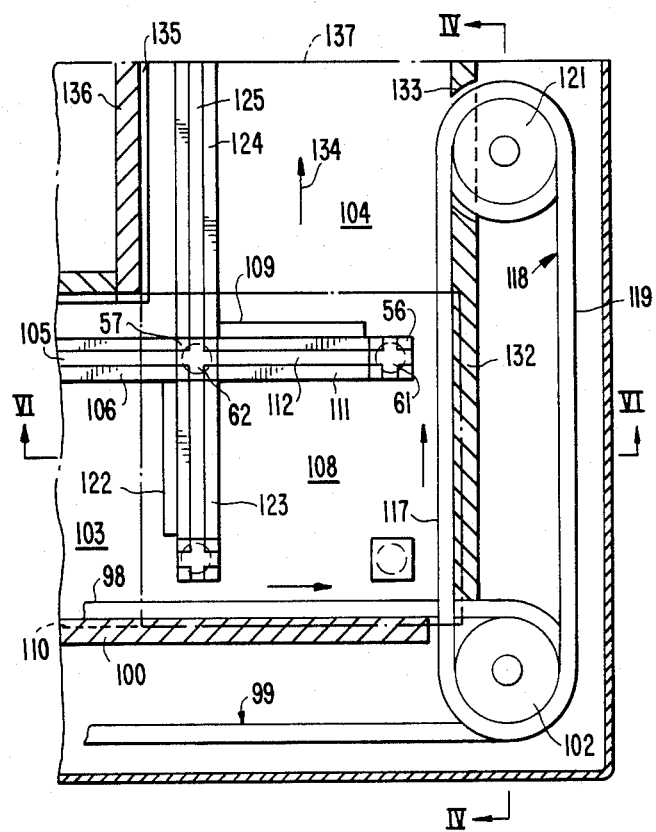
FIG. 4.
FIG. 5.

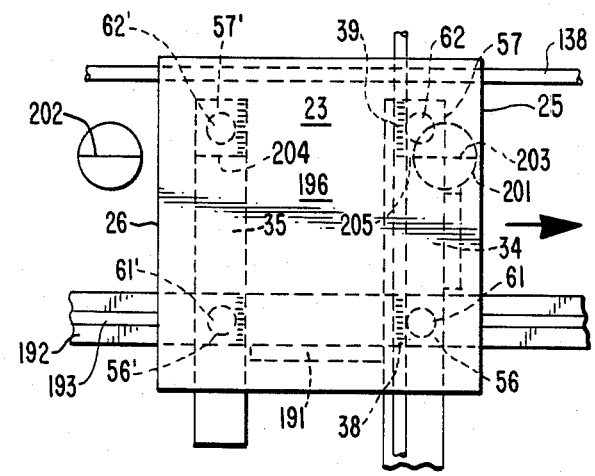
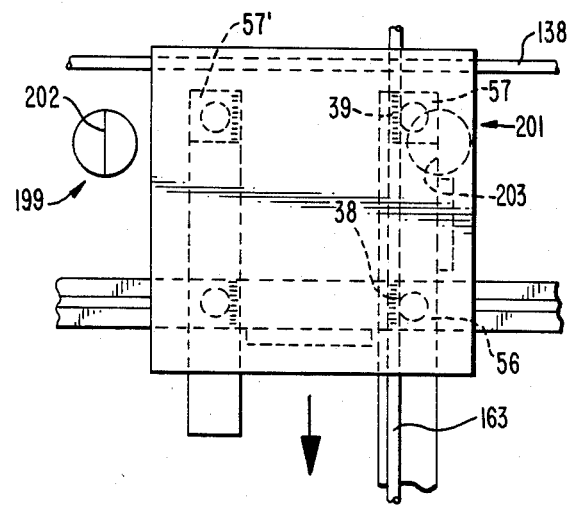
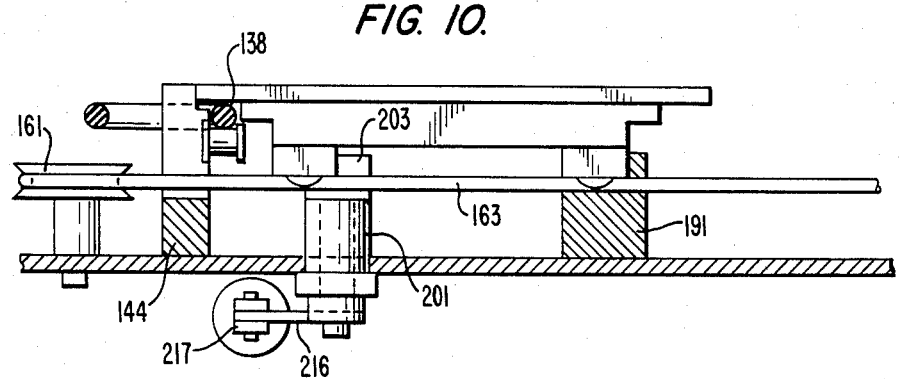

MACHINES FOR ASSEMBLING OR FOR MACHINING PARTS

The present invention relates to improvements in machines for assembling or for machining parts.

BACKGROUND OF THE INVENTION

Proposals have been made to move part-carrying supports or platens over one or more paths made up of a series of straight path portions which are perpendicular to one another and which make use of an endless belt co-operating with the plate-like body of the part-carrying platen.

Such machines tend to comprise a plurality of different modules to make it possible to build up workshops flexibly. Each module may have a considerable length of path inside it, but in an effort to reduce the total number of drive motors, each module only has one electric motor driving a single very long belt. The path is often tortuous as well as long, and the net result is the application of high forces to the belt inside a module. Thus savings in quantity of belt drive motors can lead to considerable expense in obtaining belts of sufficient strength to withstand said forces.

Preferred embodiments of the invention enable readily available, cheap belts to be used, while still retaining the principle of one belt drive motor per module.

SUMMARY OF THE INVENTION

The present invention provides an installation for assembling and/or machining parts manually and/or automatically, the installation comprising a plurality of stations or modules through which part-carrying platens move along a path comprising successive horizontal path portions extending at right angles to one another, said platens being driven along successive path portions by successive belts which at least partially support the platens, the improvement wherein each module has as many belts as it has perpendicular path portions, with each belt comprising an endless loop having a go or driving portion and a return portion, said portions extending between a pair of vertical axis pulleys located in the vicinity of the ends of each path portion, with successive perpendicular endless loops being at different horizontal levels, whereby successive loops within a module share a common pulley having two loop-receiving grooves at said different levels, thereby enabling a single motor to drive all the endless loops within any one module.

Each belt can thus be relatively short and is not subjected to very great forces. Cheap, commercially available belts are quite suitable for the purpose.

The invention also provides platens suitable for co-operating with belts at different levels. A first or top level co-operates with a strip of teeth running along the underside of the plate-like body of the platen, a second or lower level co-operates with teeth on the underside of a guide block which projects down from the plate-like body, and a third or bottom level can co-operate with teeth on the underside of studs projecting down from the guide block. The teeth at the first and second levels should be arranged to act in directions which are at right angles. The third or bottom level is used for transient drive to cover gaps between the other two levels. Such gaps may occur at crossing points which are also switches.

To make the platens move freely, the studs may have respective rolling balls projecting down from their undersides. This kind of rolling balls is known per se and serves to track a guide groove running along the bottom of the module.

By reducing the stresses and stains to which the belts are subjected, it is not only possible to use belts which are cheaper than before, they also last longer.

Generally speaking the belts should be of circular section.

Advantageously the belt co-operates with a strip of teeth on the underside of the platen.

The guide blocks can be used to suspend coding devices or shoes. In such a case, the coding means should be located near the middle of the guide block while the drive means are located near to its ends.

It is also possible to encode data using the drive strips of teeth themselves. The exact length and location of said strips is not necessarily critical for belt drive purposes, in which case variations within quite wide tolerances can be detected by suitable sensors and used to identify platens, etc.

The ball bearings may be handling ball bearings.

BRIEF DESCRIPTION OF THE DRAWINGS

Embodiments of the invention are described by way of example with reference to the accompanying drawings, in which:

FIG. 3 is an underview of a part-carrying platen;

FIG. 4 is a plan view of a portion of the second module in FIG. 1, but to a larger scale;

FIG. 5 is a section along a line V—V in FIG. 4;

FIG. 8 is a larger scale plan view of a portion of the module shown in FIG. 7;

FIG. 9 is a similar view to FIG. 8, but showing the module in another condition;

FIG. 10 is a section along a line X—X in FIG. 7;

DETAILED DESCRIPTION

Figure 1:
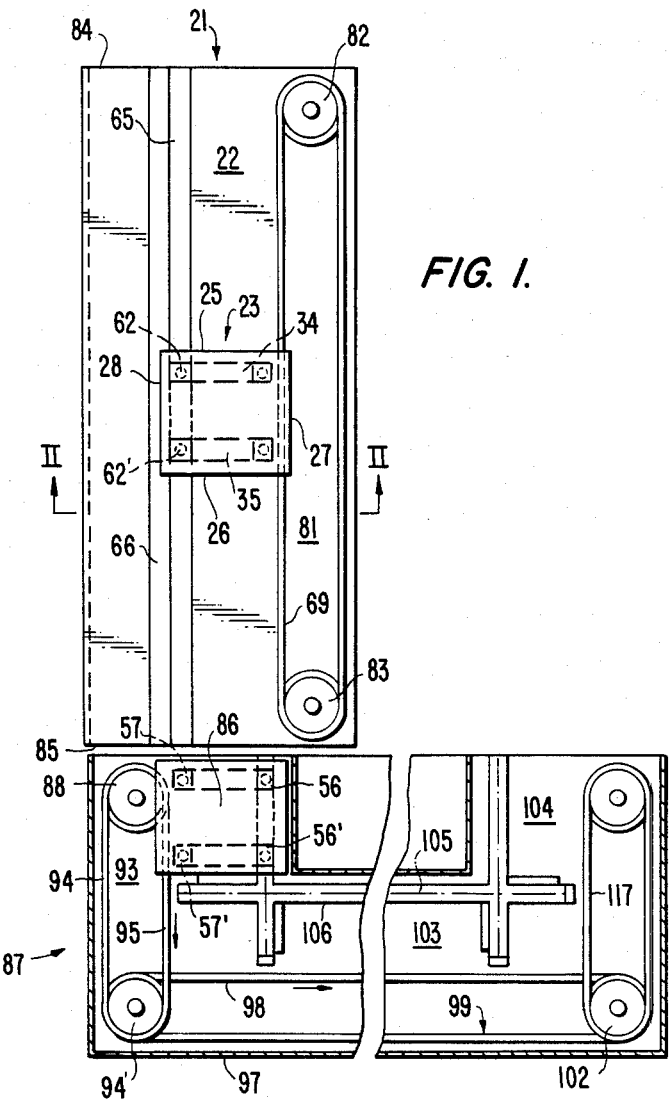
FIG. 1 is a schematic plan view of a quick return module and of a transverse or perpendicular module.
Figure 2:
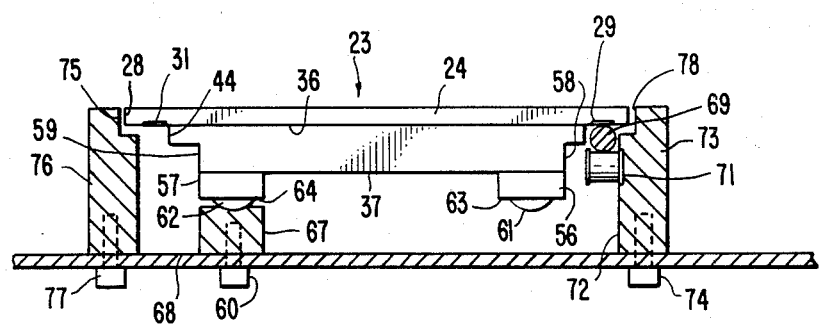
FIG. 2 is a section along a line II—II in FIG. 1, but to a larger scale.

FIG. 1 shows a rapid return module 21 having a path 22 along which there moves a part-carrying platen 23. The platen 23 comprises a rectangular, eg. square, plate or body 24 (see FIG. 2) having a trailing edge 25 (this edge is on the right for an observer located in front of the machine), a leading edge 26 (ie. to the left), a front edge 27 and a back edge 28. Two longitudinally extending strips 29 and 31 of transverse teeth run along the underside of the platen 23 close to its front and back edges 27 and 28. The ends of these strips fall short of the trailing and leading edges (see FIG. 3, for example, where the ends 32 and 33 do not meet the edge 25). Two transverse rectangular guide blocks 34 and 35 project downwards from the underside of the platen 23.

The bottom face 37 of each of the guide blocks has two transverse strips of metal teeth. The strips are of different lengths. Thus the guide block 34 has a short strip 38 and a long strip 39, with the front end 41 of the short strip 38 being close to the front vertical face 42 of the guide block, while the back end 43 of the long strip 39 is close to the back vertical face 44 of the guide block. However, since the strips are of different lengths, the opposite end 45 of the short strip 38 is further from the longitudinal mid plane 49 of the platen 23 than is the opposite end 51 of the long strip 39. The strips on the guide blocks are diammetrically symmetrical, ie. strips of the same length are close to diagonally opposite corners of the platen 23. It is thus possible to distinguish any edge of the platen from the opposite edge, and this effect is used in the automatic control of platen movement with suitable sensors being located in the modules for detecting the necessary information.

In the middle of each guide block, there are three longitudinally extending shoes or contacts $52_1$, $52_2$, and $52_3$ which are independently mounted to rotate about a common transverse axis 53, and which have bevelled bottom faces. Each shoe can take up two different positions: a first position in which its bevelled end projects beyond the bottom face 37 of the guide block, and a second position in which the shoe is completely received inside the guide block. The shoes are used to encode data concerning the platen, said data being detected, where necessary by corresponding feeler fingers in the modules.

Near each guide block end there is a rectangular stud 56 or 57. Each stud houses a ball bearing 61 or 62 which projects downwards from the bottom face 63 or 64 of the stud. The bottom faces have short strips of transverse teeth similar to the strips 38 and 39, but at a lower level. The bearings are used both to reduce friction when moving the platen and for positionning the platen during handling. The ball bearings comprise a large ball bearing having a hidden portion received inside the stud housing with the space between the hidden portion and the inside wall of the housing being filled with very small ball bearings, so that the large ball can rotate substantially without friction about its own center. Ball bearings of this type are known per se, and are manufactured by SKF, for example.

The platen 23 is supported by means of the balls 62 and 62' of its guide blocks 34 and 35 resting in a groove 65 in the top surface 66 of a guide rail 67 which is screwed down to the bottom of the module 21 by screws 60. Two further rails are screwed down to the bottom 68 of the module 21: a front rail 73 having screws 74; and a back rail 76 having screws 77. Longitudinally extending steps 78 or 75 run along the top inside edges of the front rail 73 and the back rail 76 respectively, to receive the front edge 27 and the back edge 28 of the platen 23. The platen 23 is driven by means of its front milled or toothed strip 29 engaging in an endless belt 69 of circular cross section. The belt 69 is itself supported by idler wheels 71 which are mounted along the inside face 72 of the front rail 73 just below the step 78. The weight of the platen 23 ensures sufficient contact pressure between the toothed strip 29 and the belt 69 to transmit drive to the platen.

The endless belt 69 runs round a loop 81 defined by two vertical axis pulley wheels 82 and 83 located near to the front of the module 21, and at its right hand end 84 and its left hand end 85 respectively.

The path 22 along the module 21 is extended by a path 86 along a second module 87. The second module 87 extends generally at right angles to the first module 21. Behind the entrance to the second module 87 there is a vertical axis pulley 88 which co-operates with a pulley 94' and an endless belt having drive and return portions 95 and 94 respectively to from a second loop 93 running substantially along the entire width of the second module 87. The pulley 94' has two grooves, one above the other. Seen from the position of an operator standing in front of the machine which includes said first and second modules, the left hand or leading edge of the platen 23 engages the drive portion 95 of the endless belt 93 before the right hand or trailing edge of the platen looses contact with the belt 69, thereby ensuring that the platen 23 is driven without interruption. The belt 93 engages the back toothed strip 29 on the underside of the platen 23 in the same manner as the belt 69 engages the front toothed strip 31 which is likewise on the underside of the platen.

When the platen 23 approaches the far wall 97 of the second module 87, it is driven perpendicularly to its previous direction of movement by a drive portion 98 of an endless belt 99 which extends at right angles to the belt 93 and which uses the lower groove in the pulley wheel 94'. At the other end of its loop, the belt 99 goes round the lower groove of a pulley wheel 102 which likewise has an upper groove and a lower groove. The platen changes its direction of movement a first time when it leaves the path 86 by which it entered the second module 87 to follow a perpendicular path 103. There is a second change of direction at the other end of the path 103 when the platen is driven along a path 104 which is parallel to the path 86. The manner in which a change of direction is accomplished is described below with reference to said second change of direction.

The drive portion 98 of the endless belt 99 drives the platen along the path 103 by co-operating with the toothed strips 39' and 38' of the guide block 35 underneath the platen 23 and near to its (originally) leading edge 26. The platen is supported by its ball bearings 61 and 62 at the (originally) trailing end of the platen engaging in a groove 105 in the top of a guide rail 106 running along the path 103 and screwed down to the bottom 107 of the second module 87.

Figure 6:
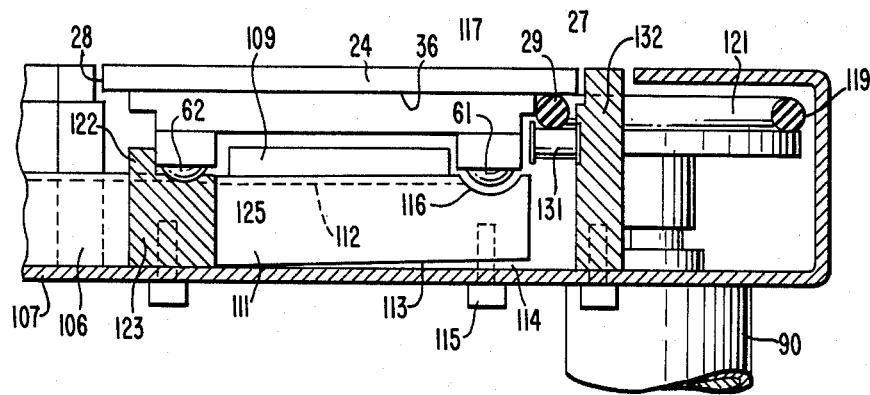
FIG. 6 is a section along a line VI—VI in FIG. 4.

When the platen arrives at the crossing point 108 between the paths 103 and 104, it is partly guided by an upwardly projecting flange 109 on a stub length of rail 111 extending the rail 106. The flange 109 co-operates with the guide block 34 of the platen. A groove 112 runs along the top of the stub rail 111 in the extension of the groove 105, and a relatively gentle upward slope is provided by inserting a washer 114 underneath the bottom face 113 of the far end of the stub rail (see FIG. 6) where it is screwed down to the bottom 107 of the second module 87 by a screw 115. At the end of the stub rail 111 there is a transverse groove or change of level 116 which ends the groove 112.

When the platen is driven by the drive portion 98 of the belt 99 to reach the crossing point 108, its (originally) trailing edge 25 is raised a little relative to its opposite (originally leading) edge 26 by the slope of the groove 112 lifting said edge 25 while the edge 26 remains in step 110 in a back rail 100 (equivalent to the step 75 in the back rail 76 of the first module 21). The bottom face of the body 24 overhangs a drive portion 117 of belt 118 before its ball bearing 61 reaches the groove 116. The portion 117 of belt 118 is at the same level as the portion 95, ie. it is above the endless loop 99. When the ball 61 drops into the groove 116 the toothed strip 29 drops under the effect of gravity onto the drive portion 117 of belt 118, without the (originally) front edge 27 of the platen bumping into it. Transfer from drive in the transverse direction by means of the toothed strips on the guide blocks, to drive in the longitudinal direction by means of the toothed strips on the plate itself, thus takes place smoothly.

The drive portion 117 is part of an endless belt 118 having a parallel return portion 119. This endless belt is arranged in the much the same manner as the entrance belt 93; one end passes round the a single groove pulley 121, while the other end passes round an upper groove 91 in a two groove pulley 102 which also has a lower groove 92 in which the endless belt 99 is received. The main difference is that the single groove pulley 121 is on a shaft driven directly by an electric motor 90, while the single groove pulley 88 is driven by the same electric motor 90 via the series connection of all three endless belts in the second module.

The platen is thus driven out from the crossing point 108 along the path 104. This movement is guided by a flange 122 similar to the flange 109 but mounted on a stub rail 123 which is mounted on the bottom 107 of the second module 87 and which extends a guide rail 124. The rails 123 and 124 have a groove 125 running along their top surfaces for receiving the balls 62 and 62' mounted in the studs 57 and 57' underneath the platen. The drive portion 117 of belt 118 is supported by idler wheels 131 mounted on a rail 132 having an opening 133 through which the endless belt 118 passes. The platen is driven away from the crossing point 108 in the direction of an arrow 134 because its weight (plus that of its load, if any) causes the toothed strip 29 running along its under side to engage the drive portion 117 of the belt 118. The opposite edge 28 (originally the back edge) co-operates with a step 135 in a rail 136.

Figure 7:
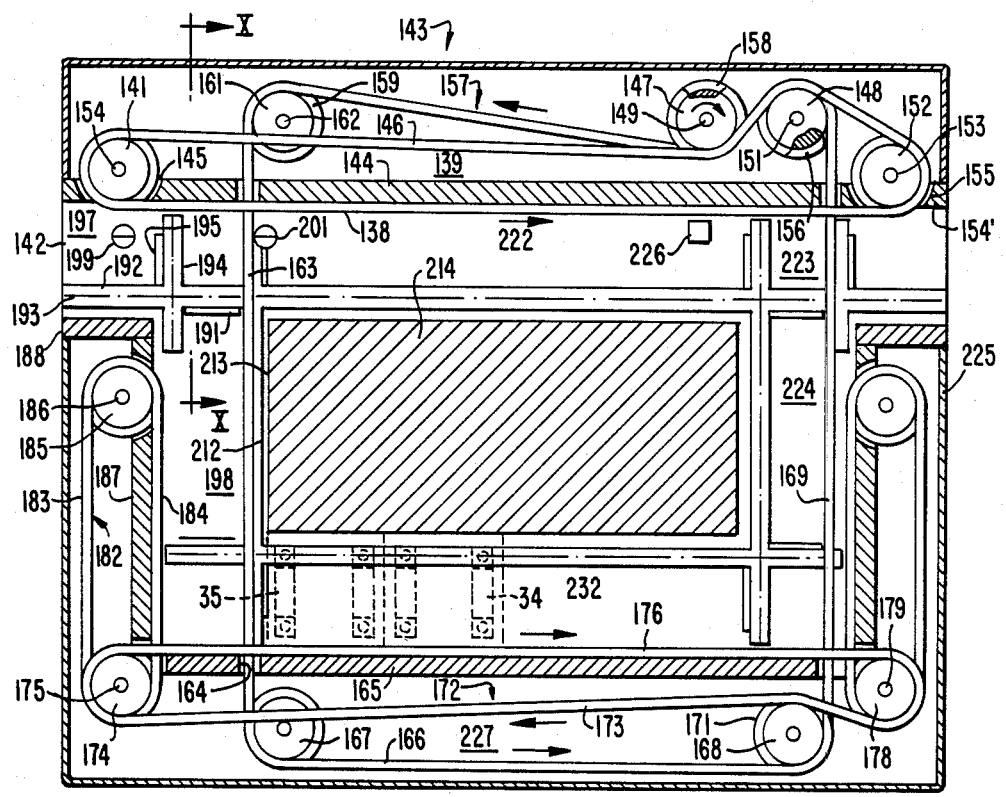
FIG. 7 is a schematic plan view of a manual assembly module.
Figure 11:
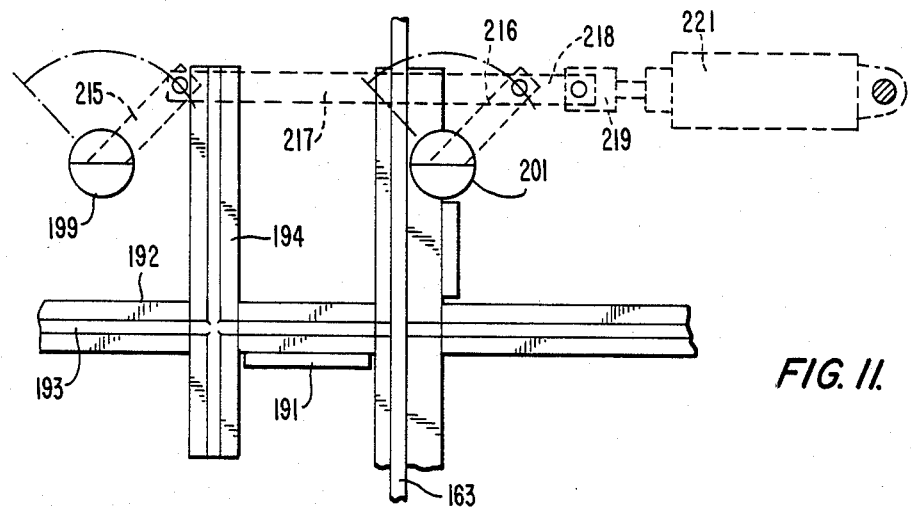
FIG. 11 is a view similar to FIG. 8, but showing an actuating jack.

At the exit 137 from the second module 87, the platen is driven for a short period of time by contact continuing between its now trailing (originally leading) edge 26 and the drive portion 117 of belt 118, while its now leading (originally trailing) edge 25 comes into driving engagement with a drive portion 13 of belt 139 (see FIG. 7) which is at the same level as the belt 118. The drive portion 138 is part of an endless belt 139 running round a pulley 141 situated close to the entrance 142 of a third module 143 intended for hand assembly of parts brought along by the platens. The belt 139 passes through an opening 145 through a rail 144 on which idler wheels are mounted to support the drive portion 138 of the belt 139. At the other end of the rail 144 there is an extension rail 154' having an opening 155 through which the belt 139 passes to go round a pulley 152 having a vertical axis 153 which lies in in the same longitudinal plane as the axis 154 of the pulley 141. Thereafter the return portion 146 of the belt passes round the back of a pulley 148 and round the front of a pulley 147 before continuing to the pulley 141 where the loop is completed. The pulleys 147 and 148 have vertical axes 149 and 151 respectively lying in a plane parallel to the longitudinal direction.

The pulley 147 is directly driven by an electric motor. Each of the pulleys 147 and 148 has two grooves: an upper groove in which the belt 139 is received, and a lower groove (158 and 156 respectively) in which an endless belt 157 is received. The belt 157 is at a level which is lower than the lowest belt 99 in the second module 87. The remainder of the path followed by the belt 157 is as follows: after leaving the drive pulley 147 it passes round a groove 159 in a pulley 161 whose axis 162 lies in the same vertical plane as the axes 149 and 151. A portion 163 of the belt 157 passes through an opening in the rail 144 and continues in a transverse direction to pass through an opening 164 in a similar longitudinal rail 165. Thereafter it passes round a pulley 167 whence a longitudinal portion 166 of the belt 157 extends to the lower groove of a two groove pulley 168. On leaving the pulley 168, the belt 157 has a transverse portion 169 which again passes through both the longitudinal rails 165 and 144 to complete the loop by going round the pulley 148.

The pulley 168 has an upper groove 171 which serves to guide the return portion 173 of an endless belt 172 having a drive portion 176 which extends along the rail 165 supported on idler wheels. The belt 172 passes round two pulleys 174 and 178 located at the ends of the rail 165 and having respective vertical axes 175 and 179 lying in the same longitudinal plane. The belt 172 is in the same upper horizontal plane as the belts 139, 118, 93, and 81. Belts at this level are symbolised in the figures by solid black lines.

The pulley 174 has two grooves, and its lower groove guides an endless belt 182 having horizontal drive and return portions 184 and 183 respectively. The other end of the belt 182 goes round a pulley 185 which rotates about a vertical axis 186 lying in the same transverse plane as the axis 175. The belt 182 is at an intermediate level which is the same as that of the belt 99, and is symbolised by a broken thick black line.

The belt 182 has its drive portion 184 supported on idler wheels which are mounted on a transverse rail 187. The end of the transverse rail 187 is L-shaped having a portion 188 which lies in the extension of the rail 132 in the second module 87.

FIG. 8 shows a part-carrying platen 23 after leaving the second module 87 under the drive of the go portion 117 and after arriving in the third module 143 to be driven by the go portion 138 of the endless belt 139. The platen 23 is guided in part by means of a flange 191 on a stub length of guide rail 192 having a groove 193. There is also a flange 195 on a stub length of guide rail 194 which is held fast to the stub length 192 and which is perpendicular thereto.

The crossing point 196 between the entrance path 197 to the third module, and a transverse path 198 at right angles thereto is fitted with vertical cylindrical pins 199 and 201 which are mounted to rotate about their own axes and which have stepped top portions delimited by vertical plane portions 202 and 203 extending along their diameters. In the position shown in FIG. 8, said vertical planes are in longitudinal alignment. The platen 23 is driven by the drive portion 138 and runs with its (originally) front ball bearings engaged in the groove 193 on the rail 192 and its stub extension. It is guided by the longitudinal face 205 of its (originally trailing) and now leading back stud 57 sliding over the plane 202, and then over the plane 203. Meanwhile, the parallel face 204 of the now trailing stud 57' has slid over the plane 202. Before reaching the middle of the crossing point, the now leading edge 25 of the platen is lifted as explained above with reference to FIG. 6, and then the platen falls under gravity in such a manner that the bottom faces of its now leading studs 56 and 57 drop onto the portion 163 of the endless belt 157. The teeth on the bottom faces 63 and 64 of the studs engage the belt 157, but the platen is not driven thereby because of the positive stop action of the stud face 205 encountering the pin face 203. The platen thus continues to move in a longitudinal direction, being guided by its stud 56' sliding along the flange 191.

In contrast, FIG. 9 shows a position in which the platen moves transversely away from the crossing point 196 as driven by the belt 157. The pins 199 and 201 are rotated through 90° relative to the position shown in FIG. 8. This is done after both the now leading stud 57 and the now trailing stud 57' have gone past the pin 199, but before the now leading stud 57 reaches the pin 201. Thus when the stud 57 does reach the pin 201 it is stopped by the plane 203 which prevents it from follownig the go portion 138 of the top level belt 139, but which enables the platen to be driven by the bottom level belt 157 once the platen has been lifted and has fallen back down in the manner described with reference to FIG. 6. At the start of this movement, the flange 195 helps to guide the platen as it moves off transversally. The bottom level belt 157 is used as a drive belt only over a very short initial portion of the transverse movement of the platen. Once the platen is moving transversally, its drive is taken over by the middle level endless belt 182. The bottom level belt 157 is thus used only transiently as the platen passes through the crossing point. Once the transient portion is over, the toothed strip 38' on the guide block 35 engages the drive portion 184 of the belt 182 at the middle level and it is the belt 182 which drives the platen. The opposite endge of the platen is guided along a step 212 in the side 213 of rectangular block 214 occupying the middle of the third module.

In the position shown in FIG. 9, the pin 199 has its vertical plane 202 set to oppose the arrival of any further platens to the crossing point 196.

The pins 199 and 201 are actuated by means of lever arms or handles 215 and 216 connected to a link rod 217 having one end 218 driven by the moving portion 219 of a jack.

In addition to having the toothed strips 29 and 31 along the underside of the body plate 24 of the platen, further toothed strips may be provided along the end faces of the guide blocks 34 and 35 so that the ends of the guide blocks can contribute to the driving connection between the platen and top level belts.

After moving along the longitudinal path 222 in line with the entrance path 197 to the third module 143 under the drive of the drive portion 138 of the top level belt 139, the platen 23 will arrive at a crossing point 223 with a transverse path 224 which is parallel to the path 198 but adjacent to the far transverse wall 225 of the module. The bottom level belt 157 at this point has a portion 169 which, when it engages the toothed strip 62 on the bottom face of the stud 56, will tend to urge the platen more tightly against the portion 138 of the top level belt 139, which increases the drive therefrom and facilitates exit from the third module.

A removable stop 226 is provided near the exit from the path 222. An operator can use this stop to prevent platens from leaving the path 222 until they are required. Thus, platens on the straight through path can be held up at will to avoid them interfering with platens that have been round the other three sides of the third module, and in particular along the other longitudinal path 227 which is used as an assembly path for parts carried by the platens. The extra thrust against the top level belt drive portion 138 as provided by the bottom level belt portion 169 can only be of assistance in ensuring that platens are reliably moved on from the third module.

In each of the modules, the endless belts are arranged around relatively short loops. Each belt thus only has to drive one platen, or at most only a few platens, at any one time. Platens provide very little resistance to movement on account of their ball bearings. Each belt is thus subjected to a relatively small traction force. The belt material can thus be chosen to optimise requirements other than having sufficient strength, eg. long life. The belts are preferably of circular cross section as already described.

Reference is now made to FIGS. 12 to 15 which show an automatic work station constituting one of the modules of the machine as a whole. The station has a work booth 231 between two cross beams 232 and 233 which have facing slideways 234 for receiving a platen. A limit to forward movement of a platen in the slideways is set by two front stops 235 and 236. The end of a longitudinal platen running rail 237 is fixed to the cross beam 232 and the front edges 238 of platens 239 run therealong. The platens are driven by a belt 241 of circular section which co-operates with a toothed strip 242 running longitudinally along the underside of the back edges of the platens. Opposite the booth 231 and lower down, there is an L-shaped slider 243 having a horizontal branch 244 and a vertical branch 245. The vertical branch 245 is fixed to the end 246 of the moving portion 247 of a jack whose body 248 is fixed to the under surface 249 of a generally omega-shaped beam 251. The beam 251 has a wide bottom 252 which ends with front and back longitudinal U-shaped border members 254 and 253. A rail 255 supports the belt 241 and runs along the front of the back border member 253. The rail 255 is slotted to allow the horizontal branch 244 of the slider 243 to pass through. A groove 256 of rectangular section suitable for receiving the back studs 257 of a platen 239 runs along the top face of the horizontal branch 244 near to the front end thereof. Close to its intersection with the vertical branch, the horizontal branch 244 also has a running groove 258.

Figure 13:
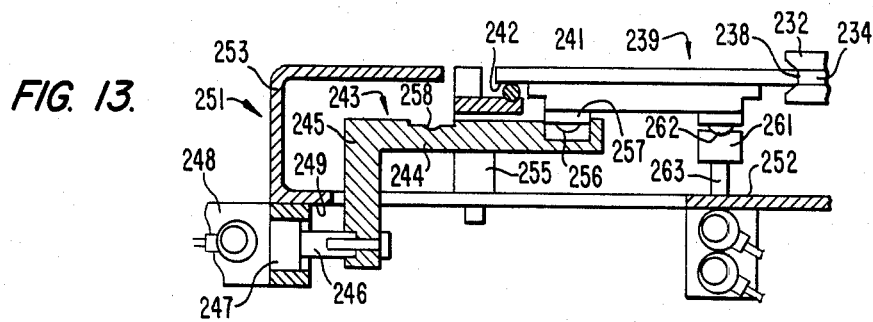
FIG. 13 is a view of a portion of FIG. 12 with the module in a different condition.
Figure 14:
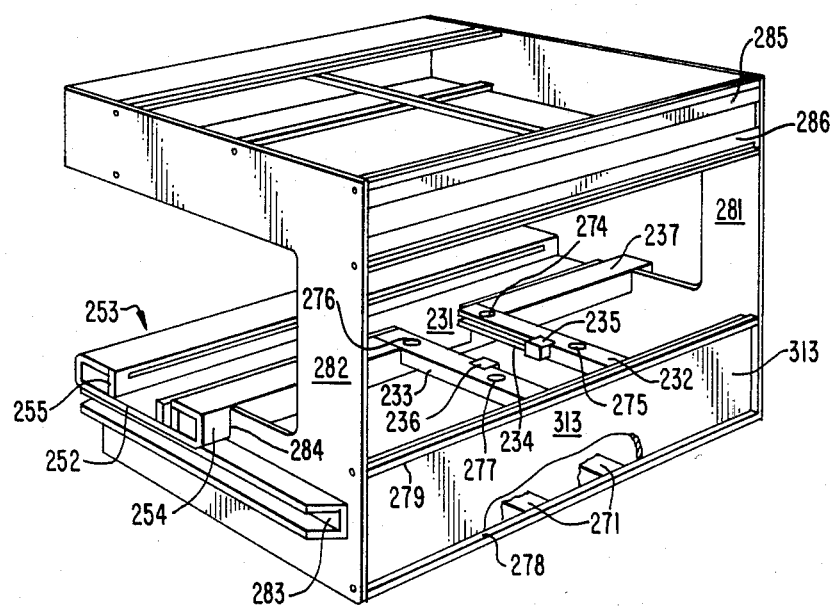
FIG. 14 is a schematic perspective view of the FIG. 12 module in a partly disassembled state.

FIG. 13 shows a platen which is driven by the belt 241 until it comes up to the booth 231. Over the last portion of its travel, the platen is supported by a peg 261 having a running groove 262 which receives the ball bearings of the front studs of the platens, and which is retractably mounted on the end of a vertical rod 263.

Figure 12:
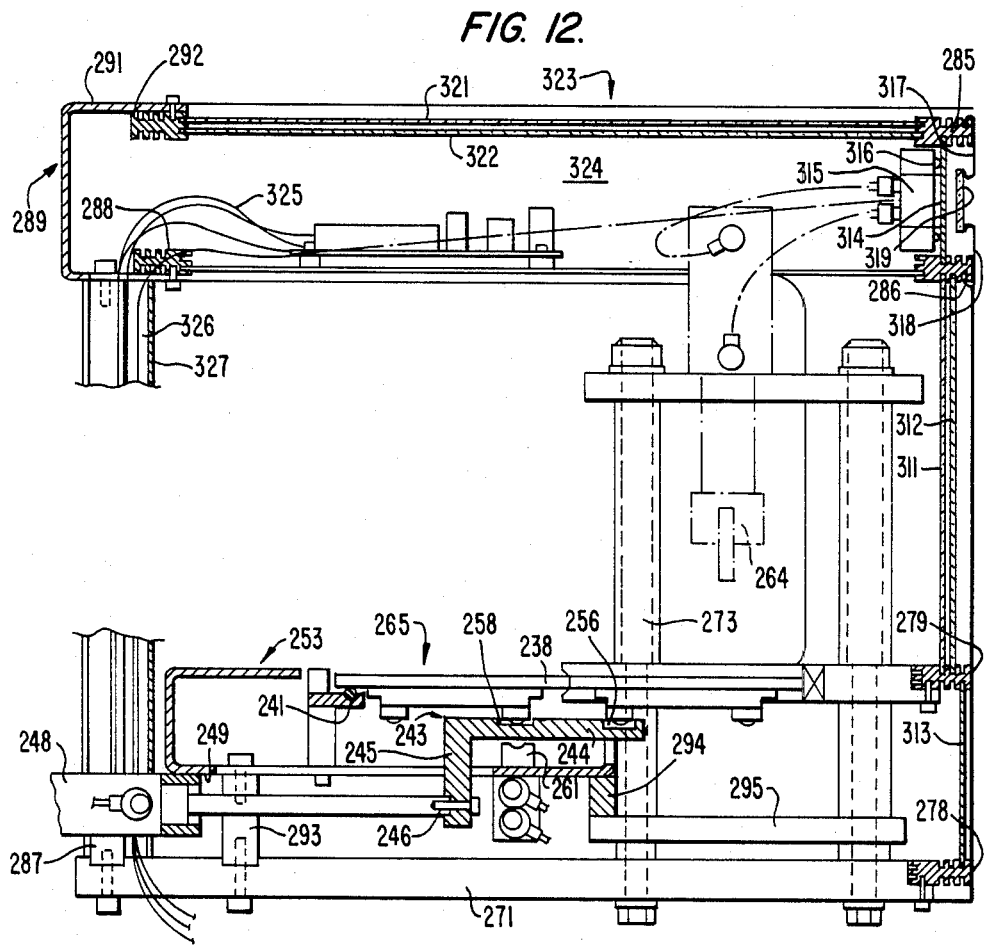
FIG. 12 is a vertical section through an automatic work station module.

Once a platen has reached the booth 231, the jack 248 is actuated. The side edges of the platen are inserted into the slideways 234, while the peg 261 is in the retracted position. The end of insertion position is shown in FIG. 12. The front edge of the platen is engaged against the front stops 235 and 236. The platen and the part it is carrying are then properly placed for the part to be worked on by a tool outlined at 264. In this position of the slider 243, its groove 256 lies in the extension of the front longitudinal rail 237 of the module in such a manner that another platen arriving on the module can continue past the work booth 231 without being hindered by the platen which is being worked on therein. The peg 261 remains retracted under these circumstances.

The automatic work station has a frame comprising two transverse beams 271 underneath the cross beams 232 and 233. Vertical columns 273 are bolted to the transverse beams 271, and pass through holes 274 to 277 through the cross beams 232 and 233. A lower horizontal grooved beam 278 is fixed to the front ends of the transverse beams 271 while a middle horizontal grooved beam 279 is fixed to the front ends of the cross beams 232 and 233. The middle beam is thus at the height of the work booth 231 and runs along the entire width of the module. Side plates 281 and 282 in the form of C-shaped metal sheet are bolted to the ends of the grooved beams 278 and 279. Channel section beams 283 run along the outside of the lower portion of each of the C-shaped plates 281 and 282. The channel section beams 283 serve to slot the entire module drawer-like into the structural members of the machine of which it forms a part. The lower portion of each of the C-shaped plates 281 and 282 is notched to receive the platen conveyor as constituted by the omega-shaped beam and its associated equipment. The ends of the conveyor are fixed to the channel section beams 283.

Two more grooved beams 285 and 286 are placed parallel to the beams 278 and 279 in between the end plates 281 and 282. The beam 286 is an upper beam running along the top of a "window" to the booth while the beam 285 is a topmost beam running along the top front edge of the module as a whole. The back ends of the transverse beams 271 are bolted to posts 287. Another grooved beam 288 is fixed to the tops of said posts, as is a U-shaped cover sheet 289 for the back end of the top branch of the C-shape. A sixth grooved beam 292 runs along the top edge 291 of the cover sheet 289.

Short posts 293 have their bottom ends fixed to the transverse beams 271 and their top ends fixed to the boarder member 253. A beam 294 runs along the bottom front corner of the boarder member 253 and is also fixed to a frame 295 which is fixed to the colums 273 just above the transverse beams 271.

Figure 15:
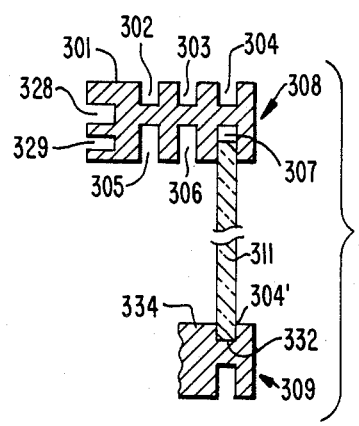
FIG. 15 is a schematic section through two beams used in the FIG. 12 module.

A pair of grooved beams 308 and 309 are shown in section in FIG. 15. Their overall outline is generally rectangular, but there are three shallow grooves 302 to 304 running in parallel along their top large faces 301 or 313 and three deeper grooves 305 to 307 running along the bottom large faces. The use of such grooved beams in pairs makes it easy to fasten boards 311 in between the beams.

Thus, for example, by holding a board 311 so that its bottom edge 332 is roughly level with the top face 334 of the bottom grooved beam 309 of a pair, it is then possible to insert the top edge of the board in a deep groove 307 in the top beam 308, swing the bottom edge over a shallow groove 304' in the bottom beam and then release the board so that it drops into the shallow groove. So long as the dimensions match, the board 311 is then securely held top and bottom as shown in FIG. 15.

The boards may be made of metal sheet or of transparent sheet such as "plexiglass". Thus between the beams 279 and 286 running along the top and the bottom of a "window" on the work booth 231, there are two transparent sheets 311 and 312. They are free to slide horizontally like some kinds of car window, whereby access may be obtained to the booth, or else it can be closed off, depending on requirements.

A metal sheet 313 extends continuously between the bottom beam 278 and the middle beam 279, thus providing the usual degree of protection to keep personnel out from the space underneath the work booth 231.

A steel sheet 314 is mounted between the upper beam 286 and the topmost beam 285. Various control switches and warning lights 316 and 315 are mounted on the sheet 314, and although they are accessible from outside the module, they are protected behind removable clip-on strips of plastic 317 and 318 which between them hold a transparent sheet 319.

Two transparent sheets 321 and 322 are inserted between the topmost beam 285 and the beam 292 to serve as a ceiling for a box or housing 324 for various items of electro-pneumatic machinery. Electricity or compressed air leads 325 housed in the box 324 pass through the voids 326 left between the posts 287 and tubular walls 327 surrounding them.

This kind of organization provides maximum safety for operating personnel, while enabling them to inspect proper operation of almost any kind of utilisation that may be required for a given module.

We claim:

1. An installation for assembling and/or machining parts manually and/or automatically, the installation comprising a plurality of stations or modules through which part-carrying platens move along a path comprising successive horizontal path portions extending at right angles to one another, said platens being driven along successive path portions by successive belts which at least partially support the platens, wherein each module has as many belts as it has perpendicular path portions, with each belt comprising an endless loop having a driving portion and a return portion, said portions extending between a pair of vertical axis pulleys located in the vicinity of the ends of each path portion, with successive perpendicular endless loops being at different horizontal levels, whereby successive loops within a module share a common pulley having two loop-receiving grooves at said different levels, thereby enabling a single motor to drive all the endless loops within any one module.

2. An installation according to claim 1, wherein the platens have ball bearings for running along a ball bearing guide in the bottoms of the modules.

3. An installation according to claim 2, wherein the ball bearings provide means for positioning the platen during handing thereof.

4. An installation according to claim 3, wherein the ball bearing guide comprises a groove in a guide rail laid along the bottom of the module.

5. An installation according to claim 4, wherein said groove in the top of a guide rail rises at the end of a straight path portion to so lift the platen that a strip portion for drive in the following perpendicular direction is lifted above the belt for drive in said direction, said rising portion ending in a transverse groove enabling the platen to drop onto said drive belt under the effect of its own weight.

6. An installation according to claim 4, wherein a guide rail having a groove in its top surface also includes an upwardly projecting flange at the intersection of two perpendicular path portions to help keep the platen in place by means of the guide block co-operating with the flange.

7. An installation according to claim 1, wherein drive zones are provided on two different levels on the undersides of the platens, the drive zones on one level being at right angles to the drive zones of the other level.

8. An installation according to claim 7, wherein the platens gave first strip zones running along parallel margins of the underside of the platens, guide blocks running perpendicularly to said first strip zones and having strip zones for drive at right angles to said first strip zones, and studs located at the ends of said guide blocks, said studs having ball bearings projecting down therefrom providing means for positioning the platen during handling thereof.

9. An installation according to claim 1, wherein the endless loop belts for longitudinal drive are at a higher level than the belts for transverse drive.

10. An installation according to claim 1, wherein crossing points are provided where a platen may take one or the other of two perpendicular exit directions, with the endless loop belts for each of the exit directions leaving a gap for an endless loop to drive the platens into the crossing point.

11. An installation according to claim 10, wherein the endless loop belts for longitudinal drive are at a higher level than the belts for transverse drive, and wherein said gap between the belts extends in the transverse direction.

12. An installation according to claim 11, wherein a third endless loop belt is provided for performing temporary transverse drive across said gap.

13. An installation according to claim 12, wherein said third endless loop belt is at a lower level than the belts used for main drive in either the longitudinal or the transverse directions.

14. An installation according to claim 13, wherein wherein the platens have strip drive zones for co-operating with said lowest level of belt disposed on the bottom faces of said studs.

15. An installation according to claim 14, wherein said crossing point includes means for raising the platen and then alowing it to fall so that the studs drop onto said lowest level of drive belt.

16. An installation according to claim 9, wherein said crossing point includes movable stop means for preventing the platens from moving in one or the other of said exit directions.

17. An installation according to claim 10, wherein said modules comprise assembly modules having an entry crossing point.

18. An installation according to claim 17 wherein the lowest level endless loop belt of said modules also serves to distribute drive to the other belts in the module, by means of pulleys having sufficient grooves for receiving drive from said lowest belt and for transmitting drive to said other belts.

19. An installation according to claim 1, in combination with a part-carrying platen suitable for travelling around said installation, wherein said platen comprises a plate body member, transverse guide blocks and studs projecting down from the ends of the guide blocks, wherein the studs have transversal strip drive zones.

20. An installation according to claim 19, wherein the platen further comprises a plate body member, transverse guide blocks and studs projecting down from the ends of the guide blocks, wherein the guide blocks have strip drive zones in the form of toothed metal strips which are disposed at the ends of the guide blocks in patterns which differ on either side of a longitudinal mid plane through the platen.

21. An installation according to claim 1, further comprising an automatic work station module of generally parallelipiped shape, with a closed front face and C-shaped side faces which are open towards the back of the module.

22. An installation according to claim 21, wherein said automatic work station module comprises structural members connected to a station framework.

23. An installation according to claim 22, wherein said structural members include longitudinal beams extending between the C-shaped side faces.

24. An installation according to claim 23, wherein said longitudinal beams include grooves for receiving sliding boards or sheets.

25. An installation according to claim 24, wherein the front sheets are transparent.

26. An installation according to claim 21, wherein transverse channel section beams are fixed to said C-shaped side faces for slotting the module into the structure of the installation.

27. An installation according to claim 21, wherein the upper portion of said module houses electrical, mechanical, and/or pneumatic equipment.

28. An installation according to claim 21, including a platen conveyor at the back of said automatic work station module.

29. An installation according to claim 28, including a transversal slide for moving a platen off said conveyor and into a work booth located in said module.

30. An installation according to claim 29, wherein the slide includes means for ensuring continuity of the conveyor to enable subsequent platens to be conveyed past an earlier platen which is moved into the booth.

* * * * *